United States Patent [19]

Sweet et al.

[11] 4,097,034
[45] Jun. 27, 1978

[54] AIR-RIDE SUSPENSION SYSTEM

[75] Inventors: Philip J. Sweet; Buck C. Hamlet; David L. Sweet, all of Fresno, Calif.

[73] Assignee: American Carrier Equipment, Inc., Calif.

[21] Appl. No.: 785,344

[22] Filed: Apr. 7, 1977

[51] Int. Cl.² .............................................. B60G 11/46
[52] U.S. Cl. .................................. 267/15 A; 267/31; 267/65 A; 280/712
[58] Field of Search ............... 267/31, 65 A, 56, 65 B, 267/18, 15 A; 280/711, 710, 712, 713; 188/298; 213/43; 105/197, 3

[56] References Cited

U.S. PATENT DOCUMENTS

| | | | |
|---|---|---|---|
| 3,140,083 | 7/1964 | Paul | 267/31 |
| 3,162,465 | 12/1964 | Vaugoyeau | 267/65 A |
| 3,309,107 | 3/1967 | Chieger | 267/56 |
| 3,499,662 | 3/1970 | Paul | 267/31 |
| 3,782,753 | 1/1974 | Sweet et al. | 267/31 |
| 3,866,894 | 2/1975 | Sweet et al. | 267/31 |
| 4,009,873 | 3/1977 | Sweet et al. | 267/15 A |

Primary Examiner—James B. Marbert
Attorney, Agent, or Firm—Huebner & Worrel

[57] ABSTRACT

An improved air-ride suspension system including cradle supporting air bags adapted to be extended transversely beneath the frame of a wheeled vehicle and supported in suspension by a pair of laterally spaced leaf spring assemblies, and centering means including a link interconnecting the leaf spring assemblies and the frame of the vehicle, whereby conversion of conventional spring suspension systems to air-ride suspension systems may be facilitated with minimal loss of time and expense.

9 Claims, 5 Drawing Figures

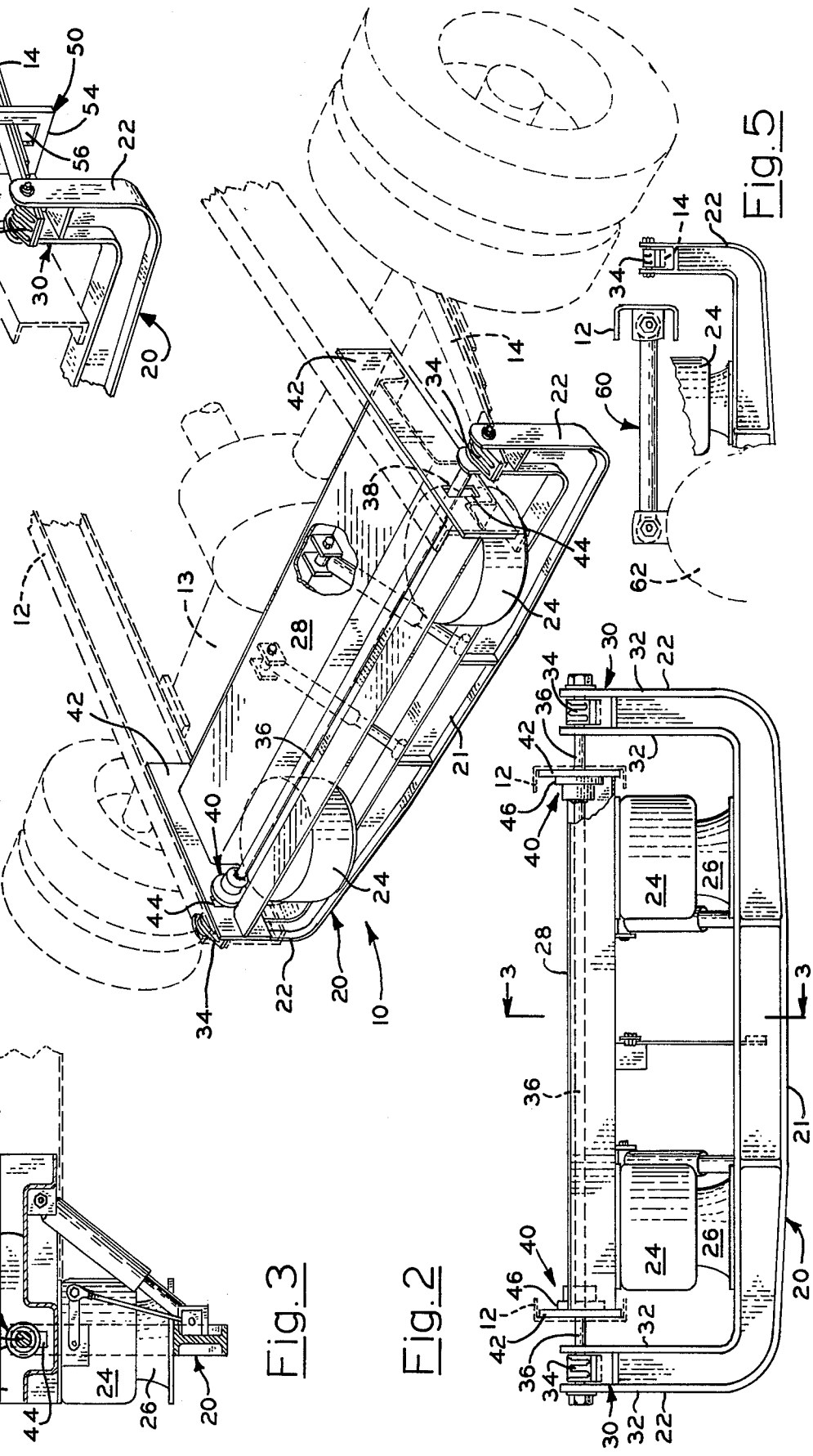

AIR-RIDE SUSPENSION SYSTEM

BACKGROUND OF THE INVENTION

The invention generally relates to air-ride suspension systems for vehicles, and more particularly to an improved air-ride suspension system adapted to be installed as an integrated unit.

The invention herein described and claimed is similar in many respects to the invention described and claimed in applicant's prior United States Patent Application No. 623,646, filed Oct. 20, 1975, now United States Letters Pat. No. 4,009,873, the disclosure of which is incorporated herein by reference thereto.

As can be appreciated by those familiar with the design, installation and operation of air-ride suspension systems, the advantages realized through the use of air springs is becoming more widely appreciated. Hence, a need for conversion frequently becomes apparent only after a vehicle has been in operation for a substantial period of time.

In order to achieve a conversion of a suspension system, it often is necessary to remove a vehicle from an operational status with attendant loss of productivity over a substantial period of time. Of course, loss of operational time on rolling stock can be expressed readily in terms of economic loss.

As more thoroughly discussed in the aforementioned patent application, difficulty often is encountered when converting a suspension system for a vehicle equipped with a live axle, because of limitations on space and inherent difficulties in achieving refitting.

As also discussed in the aforementioned application, applicants have found that it is entirely possible and economically practicable to refit vehicles with suspension systems which overcome the aforementioned difficulties and disadvantages. Such systems disclosed and claimed in that application include a cradle adapted to be extended transversely beneath the frame of the vehicle and supported at each of its opposite ends by a pair of leaf spring assemblies, a plurality of air bags mounted on the cradle in supporting relationship with the frame of a vehicle and a radius rod interconnecting the cradle with the pillow plate for purposes of maintaining a centered relationship of the frame relative to the cradle.

While the suspension system disclosed and claimed in the aforementioned patent functions quite satisfactorily for its intended purpose, it has been discovered that it is possible to utilize a non-pivotal link for interconnecting the leaf spring assemblies with the frame of the vehicle, in lieu of a rigid pivotal link extending between the pillow plate and the cradle. Of course, through the use of a rigid, non-pivotal link extending between the frame of the vehicle and the cradle for purposes of achieving lateral stability, simplicity in design is substantially enhanced.

It is, therefore, the general purpose of the instant invention to provide an improved prefabricated air-ride suspension system which is particularly adapted for use in converting suspension systems of the type characterized by leaf spring assemblies to suspension systems characterized by air bags, whereby vehicle down-time and labor requirements are minimized.

OBJECTS AND SUMMARY OF THE INVENTION

It is an object of the instant invention to provide an improved air-ride suspension system.

It is another object to provide an improved air-ride suspension assembly adapted to be installed on a wheeled vehicle including a simplified non-pivotal linkage for maintaining the suspension system in a centered relationship with the vehicle.

Another object is to provide an improved air-ride suspension assembly of simplified design particularly adapted for use in converting conventional spring suspension systems of wheeled vehicles to air-ride suspension systems, although not necessarily restricted in use thereto since the air-ride suspension assembly of the instant invention can successfully be incorporated in vehicles during new assembly.

These and other objects and advantages are achieved through an air-ride suspension system characterized by a cradle adapted to be extended transversely beneath the frame of a selected wheeled vehicle and supported at each of its opposite ends by a pair of leaf spring assemblies shackled thereto, a plurality of laterally spaced air bags mounted on the cradle in supporting relation with a pillow plate adapted to receive the frame of the vehicle in supporting relationship, and centering means for supporting the cradle in a centered relationship with the frame, as will become more readily apparent by reference to the following description and claims in light of the accompanying drawings.

BRIEF DESCRIPTION OF THE DRAWINGS

FIG. 1 is a perspective view of an air-ride suspension system which embodies the principles of the instant invention, portions of which have been broken away for the sake of clarity.

FIG. 2 is an end elevational view of the air-ride suspension system shown in FIG. 1.

FIG. 3 is a cross-sectional view taken generally along lines 3—3 of FIG. 1.

FIG. 4 is a fragmented perspective view of a modified form of the invention shown in FIGS. 1, 2 and 3.

FIG. 5 is a fragmented view of a modified form of the invention shown in FIGS. 1, 2, 3, and 4.

DESCRIPTION OF THE PREFERRED EMBODIMENT

Referring now to the drawings wherein like reference characters designate like or corresponding parts throughout the several views, there is shown in FIG. 1 an air-ride suspension assembly, generally designated 10, which embodies the principles of the instant invention.

As illustrated in FIG. 1, the air-ride suspension system 10 is disposed in supporting relation with a pair of longitudinal frame members 12 for a given vehicle. The vehicle, as shown in FIG. 1, includes a live axle characterized by a housing 13. Mounted on the housing 13 is a pair of laterally spaced, transversely oriented leaf spring assemblies 14. The leaf spring assemblies 14 are mounted employing suitable means such as U-bolts, saddles and the like, in a manner well understood by those familiar with the assembly of suspension systems for vehicles.

The air-ride suspension assembly 10 includes a cradle 20 of a truncated U-shaped configuration. The cradle, as shown, includes an elongated base portion 21 and a pair of angularly related end portions 22. The end portions 22 of the cradle 20 are connected with the leaf spring assemblies 14 in a manner which will hereinafter be more fully explained.

Seated on the upper surface of the base portion 21, in laterally spaced relationship, there is a pair of pressurized air bags 24. The specific configuration of the air bags 24 is a matter of choice dictated by factors such as space and weight constraints. Therefore, it is to be understood that both single and double convolute air bags can be employed equally as well.

Integrally related with each of the air bags 24 is a pedestal 26 which, in turn, is welded or otherwise rigidly affixed to the base 21 of the cradle 20 while seated on the upper surface of the air bags 24 is a transverse pillow plate 28. As a practical matter, the pillow plate 28 is rigidly affixed at its ends to the frame 12, as by welding or the like. The pillow plate thus receives the frame members 12 and lends vertical support thereto.

The cradle 20 is suspended from the trailing end portions of the leaf spring assemblies 14. In order to connect the cradle 20 to the leaf spring assemblies 14, each end portion 22 of the cradle 20 is provided with a relief which forms a cage 30 for receiving the trailing end portion of the leaf spring assembly. The relief cage 30, as a practical matter, comprises an opening defined between a pair of upstanding plates 32, the purpose of which will hereinafter become more readily apparent.

Mounted on and affixed to the trailing end portion of each of the leaf spring assemblies 14 there is a pillow block 34 having a bearing sleeve extended therethrough. The pillow blocks 34 are received by the cages 30 of the cradle 20. Formed in the plates 32, in coaxial alignment with the bearing sleeve of the pillow block, there is a pair of apertures, not designated. Through the apertures of the plates 32 and the sleeves of pillow blocks 34 there is extended a tie rod 36. As can be seen the tie rod 36 is of unitary construction and is common to both pillow blocks. It is to be understood that the end portions of the tie rod 36 extend through the pillow blocks and, in effect, function as bearing pins which couple the pillow blocks 34 with the cradle 20. Thus the cradle 20 is supported in suspension by the trailing end portions of the leaf spring assemblies 14.

In order to achieve lateral stability for the frame relative to the cradle 20, the tie rod 36 is extended through slots 38 formed in the frame members 12. The slots 38 are vertically oriented and horizontally aligned so that motion of the cradle 20, relative to the pair of frame members 12, in a substantially vertical plane is accommodated as the tie rod moves up and down within the slots 38. However, since it is imperative that the cradle 20 remain centered with respect to the pair of frame members 12, in order to preclude misalignment of the frame relative to the axle housing 13, a pair of bearing assemblies 40 is provided.

As best shown in FIG. 2, each of the bearing assemblies 40 includes a wear plate 42 rigidly affixed to a frame member 12, as by welding or the like. Each of the wear plates 42, like the frame member 12 to which it is attached, includes a vertically oriented slot 44, FIG. 1. Each of the slots 44 is, of course, disposed in coextensive alignment with a slot 38 so that the tie rod 36 is received simultaneously by the slots 38 and 44.

Arranged in abutting engagement with each of the wear plates 42, there is an annular bearing collar 46 mounted on the tie rod 36 in fixed concentric relation therewith. It is to be understood that the adjacent surfaces of the wear plates 42 and the bearing collars 46 form bearing surfaces which accommodate vertical movement of the tie rod 36 relative to the frame members 12, while simultaneously restraining the cradle 20 from transverse motion relative to the frame members 12. Thus the cradle 20 is restrained from transverse motion while motion in a substantially vertical plane with respect to the frame members 12 is accommodated.

Where so desired, the cradle 20 is restrained against lateral motion, relative to the frame members 12, through the use of a restraint mechanism, generally designated 50, FIG. 4, employed in lieu of the tie rod 36 and bearing assemblies 40.

While not shown, it is to be understood that the restraint mechanism 50 is rigidly affixed to the frame members 12 and project outwardly from opposite sides of the vehicle frame. The restraint mechanism 50 includes a base plate 52 welded or otherwise rigidly affixed to the frame member 12. A window plate 54 is welded to the base plate 52 and is extended substantially perpendicularly from the frame member 12 to which the plate 52 is affixed. Within the window plate 54 there is defined a rectangular slot 56 which serves to receive the trailing end portion of one of the leaf spring assemblies 14. The slots 56, of course, accommodate vertical motion of the frame members 12, relative to the adjacent end portion of the leaf spring assemblies 14, while yet supporting the frame members 12 against motion in transverse directions relative to these assemblies.

It should, therefore, be apparent that the frame members 12 are restrained against motion in transverse directions with respect to the leaf spring assemblies 14, due to the fact that each leaf spring assembly 14 is captured by one of the window plates 54 so that transverse motion of the cradle 20 relative of the frame members 12, is precluded.

As a further modification, a radius rod 60 pivotally connected between the frame 12 and the housing, designated 62, for the drive train for the vehicle can be employed for restraining the cradle 22 against lateral motion.

OPERATION

It is believed that in view of the foregoing description of the invention, the operation thereof should readily be understood. However, the operation will be reviewed briefly at this point.

Referring first to FIGS. 1, 2 and 3, it is to be understood that the cradle 20 is suspended at each of its opposite ends from one trailing end portion of one of the leaf spring assemblies 14. Moreover, it is to be understood that both of the frame members 12 are seated on the pillow plate 28 and supported by the air bags 24 affixed to the base 21 of the cradle 20.

In order to restrain the cradle 20 from motion in transverse directions with respect to the frame members 12, the bearing collars 46 engage the wear plates 42 and restrain the cradle 20 from motion in transverse directions relative to the frame. However, the collars 46 slide vertically along the adjacent surface of the wear plate 42 as vertical motion of the tie rod within the slots 38 and 44 is accommodated. Since the bearing collars 40 are fixed with respect to the tie rod 36, and the opposite ends of the tie rod 36 are affixed to the trailing ends of the leaf spring assemblies 14, transverse motion of the cradle relative to the pair of frame members 12 is precluded while relative motion in a vertical plane is facilitated.

Turning for a moment to FIG. 4, it is noted that the restraint mechanism 50 is employed in lieu of the tie rod 36 and bearing assemblies 40. It should be apparent that motion of the cradle 20 relative to the frame members 12 in vertical directions is accommodated by the window 56 of the window plate 54. However, transverse motion relative to the frame members 12 is precluded by the vertical surfaces defining the window 56 as they engage the opposite side surfaces of the leaf spring assemblies 14. Therefore, while vertical motion of the cradle 20 relative to the frame members 12 is accommodated, motion of the cradle in transverse directions with respect to the frame members 12 is precluded.

Finally, with reference to FIG. 5, it should be apparent that the radius rod 60 comprises a link which accommodates vertical motion of the cradle 22, with respect to the frame members while restraining the cradle against transverse motion.

In view of the foregoing, it should be readily apparent that the air spring assembly of the instant invention provides a practical solution to the problem of rapidly and economically converting leaf spring assemblies to air spring assemblies without sacrificing the desirable characteristics of conventional leaf spring assemblies.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a suspension system for a wheeled vehicle characterized by at least one pair of laterally spaced longitudinal frame members, a load bearing axle and a pair of laterally spaced leaf spring assemblies mounted on said axle in transverse relation therewith, the improvement comprising:
   A. a load supporting cradle having an elongated base adapted to be extended transversely beneath a pair of laterally spaced frame members for a given vehicle;
   B. means adapted to connect opposite end portions of the base of the cradle in suspension from the trailing end portions of a pair of laterally spaced leaf spring assemblies mounted on the axle in parallelism with the direction of intended vehicular travel for the vehicle;
   C. means for supporting a pair of frame members for the vehicle including at least one pair of mutually spaced air bags seated on said base and a pillow plate seated on the air bags and adapted to be connected to the frame members; and
   D. centering means for restraining said cradle from transverse motion relative to said pair of frame members including a link rigidly extended in substantial parallelism with said base and adapted to be connected with at least one leaf spring assembly of said pair of leaf spring assemblies and one frame member of said pair for restraining the pair of frame members from lateral motion relative to said leaf spring assemblies.

2. The improvement of claim 1 wherein said link includes a transverse rod adapted to be extended through each frame member of said pair of frame members and bearing means mounted on said rod supporting the rod against axial movement relative to the frame members.

3. The improvement of claim 1 wherein said link includes a plate adapted to be mounted on one frame member having a window adapted to receive said one leaf spring assembly in a captured relationship.

4. In combination with a vehicle characterized by a frame having leading and trailing ends, a wheel-supported axle transversely related to the intended direction of vehicular travel, and a pair of leaf spring assemblies mounted on the axle in transverse relation therewith, an improved air spring assembly comprising:
   a load supporting cradle extended transversely beneath said frame in trailing relation with said axle, means for suspending said cradle from the trailing ends of the leaf spring assemblies, a pair of laterally spaced air bags mounted on the cradle, an elongated pillow plate of a substantially planar configuration mounted on said air bags and extended beneath said frame in supporting relation therewith, and centering means for restraining said cradle from transverse motion relative to said frame including a link rigidly extended in substantial coplanar relation with said frame for connecting the frame with at least one leaf spring assembly of said pair of leaf spring assemblies.

5. The suspension system of claim 4 wherein said link comprises a rod extended through said frame, and means for connecting the ends of said rod with the trailing end portion of said pair of leaf spring assemblies.

6. The suspension system of claim 4 wherein said link includes at least one plate rigidly affixed to said frame having means defining therein a window adapted to receive in a captured relationship an end portion of one leaf spring assembly of said pair.

7. The suspension system of claim 5 further comprising bearing means including a pair of mutually spaced wear plates rigidly affixed to said frame having defined therein a pair of aligned slots for receiving said rod near the opposite ends thereof, and a pair of bearing collars mounted on said rod and affixed thereto in an abutting relationship with said pair of wear plates.

8. In a suspension system for a wheeled vehicle characterized by at least one pair of laterally spaced longitudinal frame members, a load bearing axle and a pair of laterally spaced leaf spring assemblies mounted on said axle in transverse relation therewith, the improvement comprising:
   A. a load supporting cradle having an elongated base adapted to be extended transversely beneath a pair of laterally spaced frame members for a given vehicle;
   B. means adapted to connect opposite end portions of the base of the cradle in suspension from the trailing end portions of a pair of laterally spaced leaf spring assemblies mounted on the axle in parallelism with the direction of intended vehicular travel for the vehicle;
   C. means for supporting a pair of frame members for the vehicle including at least one pair of mutually spaced air bags seated on said base and a pillow plate seated on the air bags and adapted to be connected to the frame members; and
   D. centering means for restraining said cradle from transverse motion relative to said pair of frame members including a link adapted to be extended in a plane substantial paralleling the plane of said base and adapted to be connected with said pair of leaf spring assemblies and said pair of frame members for restraining the pair of frame members from lateral motion relative to said leaf spring assemblies.

9. The suspension system of claim 8 wherein said link comprises a pivotal radius rod adapted to be connected at one end to one frame member of said pair of frame members and at the opposite end thereof to a housing for a drive train assembly for said vehicle.

* * * * *